(12) United States Patent
Hertel et al.

(10) Patent No.: US 9,004,112 B2
(45) Date of Patent: Apr. 14, 2015

(54) METHOD FOR ADHESIVE BONDING PLUG DETAILS FOR COMPOSITE STRUCTURES

(75) Inventors: Christopher J. Hertel, Wethersfield, CT (US); Thomas L. Cumella, West Hartford, CT (US); Anthony Rivera, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 536 days.

(21) Appl. No.: 13/417,384

(22) Filed: Mar. 12, 2012

(65) Prior Publication Data

US 2013/0232751 A1 Sep. 12, 2013

(51) Int. Cl.
*F16L 55/10* (2006.01)
*B23P 6/00* (2006.01)
*B23P 25/00* (2006.01)
*B23B 3/02* (2006.01)
*B29C 73/06* (2006.01)

(52) U.S. Cl.
CPC ............... *B23P 6/00* (2013.01); *Y10T 428/218* (2015.01); *Y10T 29/51* (2015.01); *Y10T 29/49746* (2015.01); *B23P 25/00* (2013.01); *B23B 3/02* (2013.01); *B29C 73/06* (2013.01)

(58) Field of Classification Search
CPC .. F16L 55/1116; F16L 55/124; F16L 55/1612
USPC ...................................................... 138/97, 92
See application file for complete search history.

(56) References Cited

U.S. PATENT DOCUMENTS

| | | | |
|---|---|---|---|
| 753,714 A | * | 3/1904 | Krantz ............................ 138/108 |
| 1,827,663 A | * | 10/1931 | Mastrillo ........................ 4/256.1 |
| 2,021,176 A | * | 11/1935 | Curtis .............................. 138/98 |
| 2,052,384 A | * | 8/1936 | Conran ............................ 169/70 |
| 2,577,586 A | * | 12/1951 | Maguire ........................ 411/548 |
| 2,631,360 A | * | 3/1953 | Sanford et al. ............. 29/402.11 |
| 3,094,964 A | * | 6/1963 | Witten et al. ................. 114/227 |
| 3,236,407 A | * | 2/1966 | Zelman et al. ................ 220/200 |
| 3,451,432 A | * | 6/1969 | Miller ............................. 138/90 |
| 3,700,135 A | * | 10/1972 | Collier ........................... 220/243 |
| 4,326,642 A | * | 4/1982 | Wolf .............................. 220/200 |
| 4,497,418 A | * | 2/1985 | Nunlist .......................... 220/234 |
| 4,820,564 A | | 4/1989 | Cologna et al. |
| 5,033,949 A | * | 7/1991 | Jewett ............................. 425/12 |
| 5,035,266 A | * | 7/1991 | Benson et al. ................. 138/92 |
| 5,287,892 A | * | 2/1994 | Sanderson et al. ............. 138/92 |
| 5,865,214 A | * | 2/1999 | Stearns ........................... 138/89 |

(Continued)

FOREIGN PATENT DOCUMENTS

EP 0864799 A2 9/1998
JP 2005273855 A 10/2005

OTHER PUBLICATIONS

Patent Cooperation Treaty, International Search Report and Written Opinion, Jun. 24, 2013, 13 pages.

*Primary Examiner* — James Hook
(74) *Attorney, Agent, or Firm* — Kinney & Lange, P.A.

(57) ABSTRACT

An apparatus and method for repairing defects in composite materials using a tapered disk sized to fit the part being repaired. Also included is a bolt sized to fit through a central hole in the disk. A spring is positioned on the bolt with a washer. A nut is attached to the end of the bolt and tightened to place pressure on the washer to compress the biasing device. An adhesive is applied to the tapered disk prior to engaging the composite material. A threaded bushing is used to fixedly attach a second bolt completely in the hole.

18 Claims, 3 Drawing Sheets

(56) References Cited

U.S. PATENT DOCUMENTS

| | | | |
|---|---|---|---|
| 7,464,727 B1 * | 12/2008 | Larson et al. | 138/89 |
| 7,740,028 B1 * | 6/2010 | Wilson et al. | 138/99 |
| 7,938,923 B2 * | 5/2011 | Hood | 156/94 |
| 2007/0006928 A1 | 1/2007 | Meserlian | |
| 2011/0094652 A1 | 4/2011 | Duvekot et al. | |
| 2013/0025770 A1 * | 1/2013 | Shigetomi et al. | 156/98 |

* cited by examiner

METHOD FOR ADHESIVE BONDING PLUG DETAILS FOR COMPOSITE STRUCTURES

STATEMENT OF GOVERNMENT INTEREST

This invention was made with government support under N00019-02-C-3003 awarded by the U.S. Navy. The government has certain rights in the invention.

BACKGROUND

Organic matrix composite (OMC) structures, and in particular high temperature OMCs, are finding increased applications on products such as split fan bypass ducts. Repair of mis-machined holes or small local surface damage can be expensive and complicated. A tapered composite plug is bonded inside the tapered hole that has been prepared in the duct with the use of a thermoset adhesive that requires heat and pressure for consolidation and cure. In some cases, heat and pressure are applied through the construction of a vacuum bag around the repair followed by processing in a heated, pressurized autoclave.

Current practices for adhesive bonding a plug into a large structure like a split fan duct are labor intensive and require expensive fixtures or equipment. A vacuum bag assembly could be constructed around the bond area and the part would be placed in an autoclave for the application of heat and pressure. This method requires an expensive piece of capital equipment, and the use of vacuum bags, particularly for high temperature polyimide materials, are labor intensive and subject to leaking or bag failures.

Alternately, a custom clamping mechanism could be developed in conjunction with a local heating device or the use of a large oven. This approach requires specially designed equipment and is cumbersome to apply on a large structure like a split fan duct.

It would be an advantage to provide a simple, inexpensive and effective way to place a plug in a damaged composite product such as a split fan duct.

SUMMARY

The present invention is a tapered plug used to repair small local damage or to repair mis-located or mis-machined holes in surfaces such as those made from composite materials. The tapered plug used for the duct repair has a hole through its center that is used in installing the plug in a composite material. This through hole can be used to assemble a bolt and spring assembly that applies load to the plug during the adhesive bonding process. This assembly provides a simple method for applying the required compressive load to the adhesive bond-line during the adhesive bonding operation.

The local damage area is drilled or otherwise removed, leaving a tapered hole into which the tapered plug will be attached. By compressing the spring to a given height predicated by the spring rate of the spring, the necessary load can be applied to the adhesive joint. Heat to cure the adhesive can be applied by placing the part in an oven or by using a local heating source such as a heat blanket or heat lamp.

After the plug has bonded to the composite material, the spring, washer and nut is removed and a metal bushing with a threaded hole is attached to the adhesively bonded plug, typically with rivets. A smaller bolt sized to fit in the bushing hole is then assembled to provide a flat repaired surface or for attaching hardware to the duct.

DETAILED DESCRIPTION

Figure 1:
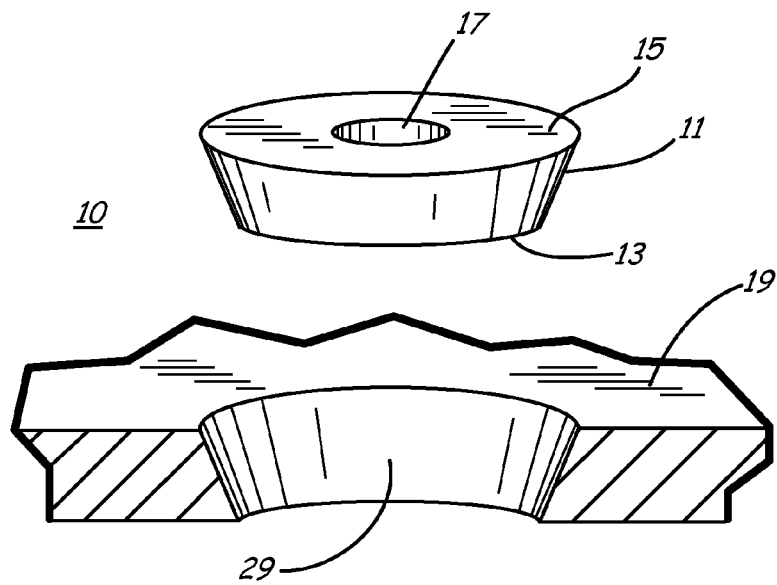
FIG. 1 is a view of the tapered plug of this invention in relation to a surface to be repaired.
Figure 3:
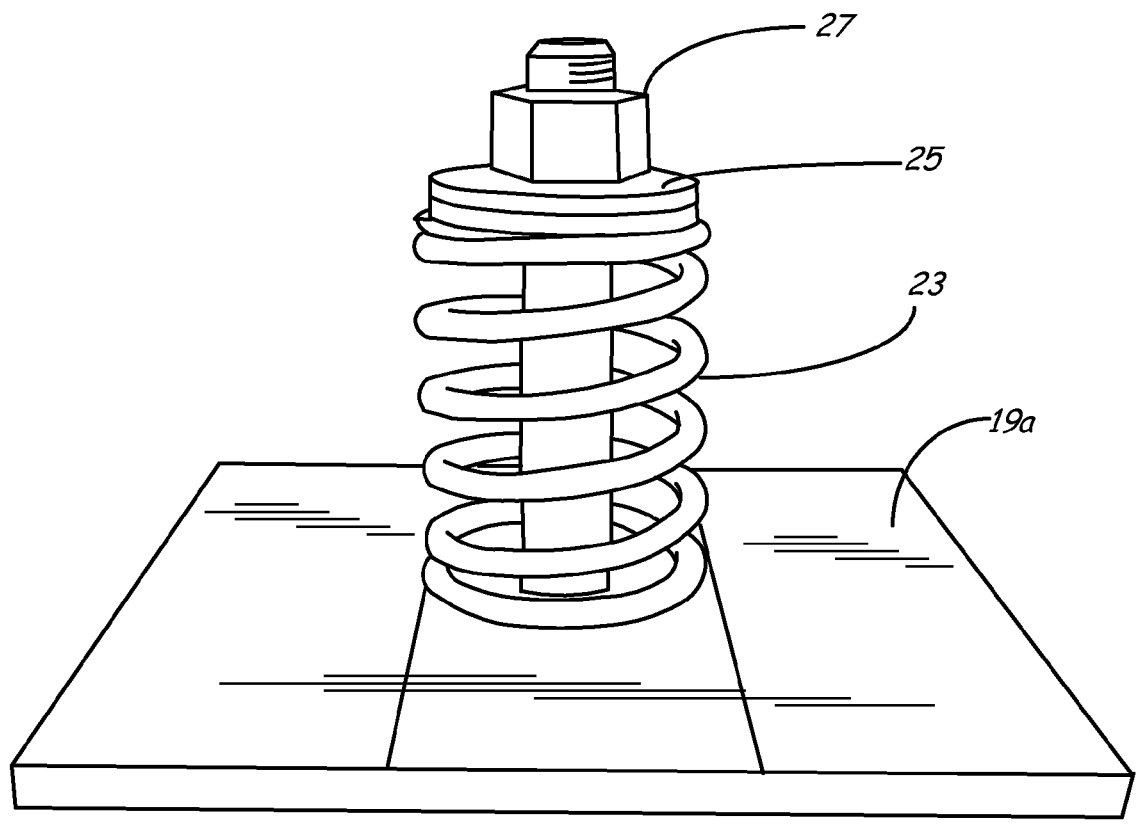
FIG. 3 is an exploded view showing installation of the plug in FIG. 1 from the bottom of the surface being repaired.

The present invention provides for placing a tapered plug 10 that has a tapered periphery 11, a bottom surface 13 and a top surface 15. Plug 10 also has a center hole 17, as seen in FIG. 1. Normally the tapered hole will be about 1 inch to 1.5 inches (2.54 cm to 3.81 cm) in diameter and will have a larger thickness than that of the composite repair section. Below plug 10 is the surface 19 to be repaired. Prior to repair, the small, local damage is removed, such as by drilling to provide a tapered surface 29 into which tapered side 11 of plug 10 engages. Either tapered surface 11 or 29, or both will have an adhesive thereon so that when the plug and bolt assembly of FIG. 3 is established, heat can be applied by placing the part in an oven, or by using a local heat source such as a heat blanket or heat lamp. Plug 10 is shown with tapered side 11 having a larger diameter on top 15 than on bottom side 13, but a plug having the opposite sizes is equally effective and tapered surface 29 of surface 19 will also be matching side 11 in either case.

Figure 2:
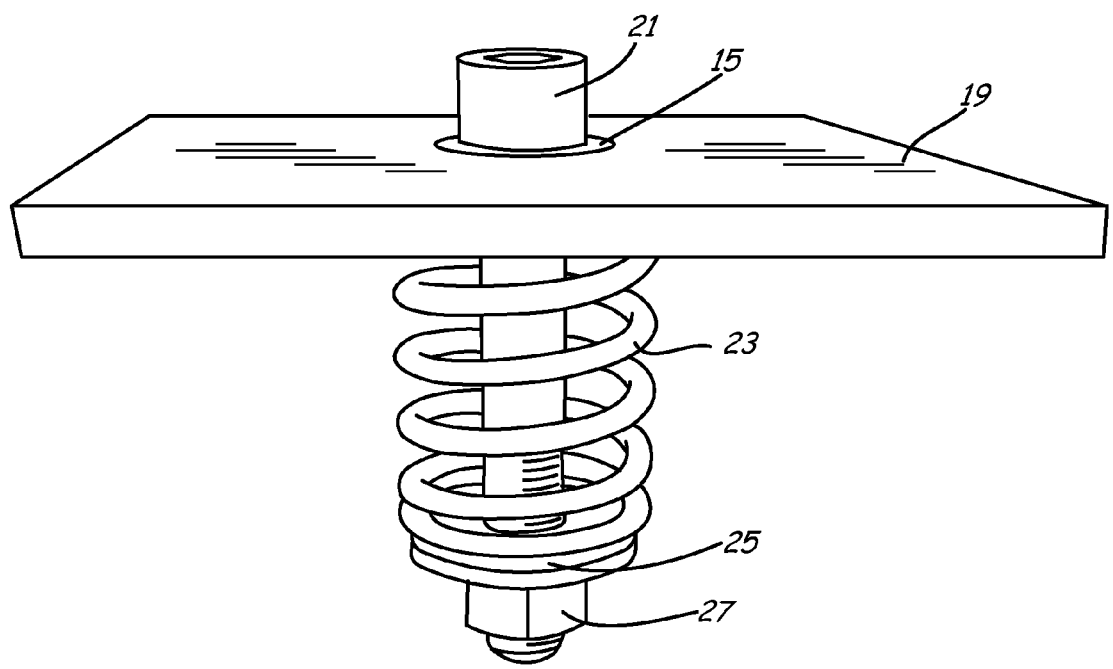
FIG. 2 is an exploded view showing installation of the plug in FIG. 1 showing the top of the surface being repaired.

FIG. 2 shows the top surface 15 of plug 10 installed in substrate 19, having repaired local damage in substrate 19. Central through hole 17 is used to assemble a bolt 21 with spring 23, at least one washer 25 and nut 27. A compressive load is applied to hold plug 10 in position during the adhesive bonding operation. By compressing spring 23 to a given height determined by the spring rate of the spring, the necessary load is applied to the adhesive joint. Normally, a spring pressure of 30 psi to 100 psi at the bond line is effective. FIG. 3 shows the same assembly as in FIG. 2 from the underside of substrate 19. As can be seen in FIG. 3, spring 23 engages the underside of surface 19a outside the bottom surface 13 of plug 10. Optionally, a washer or other element, not shown, can be provided to engage spring 23 on surface 19a as nut 27 is tightened. Plug 10 is now ready to be bonded, by application of heat to cure the adhesive.

Figure 4:
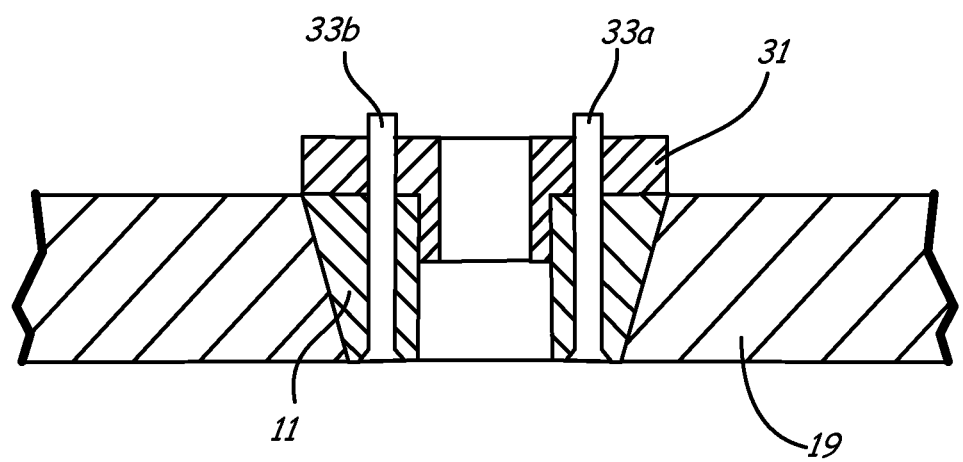
FIG. 4 is a section view of the tapered plug of this invention after it has been bonded to a surface, showing attachment of the metal bushing.

Once plug 10 has adhesively bonded to surface 19, nut 27, washer 25 and spring 23 are removed. Plug surfaces 15 and 13 protruding above the duct surfaces are machined as required to bring them flush with the duct and a metal bushing 31 with a threaded hole is installed as shown in FIG. 4. Rivets 33a and 33b are typically used keep bushing 31 firmly attached to the plug 11. Bolt 32 is sized to fit inside hole (not labeled on FIG. 4) to attach an external component to the duct, or to plug the hole.

While it is not totally essential, it is normal for the plug to be made from the same material, such as a composite, as the surface being repaired. The plug and the piece need to be made from compatible materials. One composite that has been successfully repaired is a composite of carbon fabric, which is T650-35-3k carbon fiber woven into an 8-harness satin fabric with a polyimide resin matrix such as AFR-PE-4 resin. The present invention is useful for other materials such as those made from other carbon fibers and weaves, fiberglass fibers, alternate polyimide resin systems or different resin families such as epoxies and bimaleimides and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plug for repairing defects in a surface, the plug comprising:
   a disk formed from a material compatible with the surface, the disk having a top surface, a tapered circumferential surface and a bottom surface;
   a central hole in the disk from the top to the bottom surfaces;
   an installing bushing with a threaded hole, the threaded hole being sized to engage a bolt; and
   at least one rivet fixedly attaching the bushing to the disk.

2. The plug of claim 1, wherein the plug and the surface are both a composite material selected from the group consisting of carbon fibers and weaves, and fiberglass fibers and weaves.

3. Apparatus for repairing defects in a surface, the apparatus comprising:
   a disk formed from a material compatible with the surface being repaired, the disk having a top surface, a tapered circumferential surface and a bottom surface;
   a central hole in the disk from the top to the bottom surfaces;
   a bolt sized to engage surface of the disc through the central hole in the disk and having a portion extending out from the bottom surface of the disk;
   a biasing device positioned over the portion of the bolt extending out from the disk such that one end of the biasing device engages the bottom surface of the disk;
   at least one washer positioned on the bolt against the biasing device end away from the bottom surface of the disk; and
   a nut attached to the end of the bolt, the nut being adapted to be tightened to place pressure on the at least one washer against to compress the biasing device.

4. The apparatus of claim 3, wherein the disk is formed from the same material as the surface being repaired.

5. The apparatus of claim 3, wherein the biasing device is a coil spring that exerts a spring pressure ranging from 30 psi to 100 psi.

6. The apparatus of claim 3, which further includes a bushing having a threaded hole sized to thread on to a second bolt sized to fit inside the hole of the bushing.

7. The apparatus of claim 6, which further includes at least one rivet to fixedly attach the bushing to the plug.

8. The apparatus of claim 3, wherein the tapered hole has a diameter of about 1 inch to 1.5 inches (2.54 cm to 3.81 cm).

9. The apparatus of claim 3, wherein the plug is a composite material selected from the group consisting of carbon fibers and weaves, and fiberglass fibers.

10. The apparatus of claim 3, further including an adhesive on at least one of the tapered surfaces prior to being used to repair a defect in composite material.

11. The apparatus of claim 10, wherein the adhesive is selected from the group consisting of polyimide resin, epoxy resins, and bimaleimide resins.

12. The apparatus of claim 3, wherein the tapered hole in the composite material has a decreasing tapered side from top to bottom, and wherein the tapered hole in the composite material and tapered hole in the disk are sized to mate against each other.

13. A method for repairing defects in a surface having the defect removed therefrom to form a hole having a decreasing tapered side from top to bottom, the method comprising:
   inserting a disk into the hole in the surface, the disk being formed from a material compatible with the surface, the disk having a central hole in the disk from the top to the bottom surfaces;
   placing a bolt in the central hole in the disk, the bolt having a portion extending out from the bottom surface of the disk;
   mounting a biasing device over the portion of the bolt extending out from the disk such that the biasing device engages the bottom surface of the disk;
   placing at least one washer positioned on the bolt against the biasing device end away from the bottom surface of the disk;
   tightening a nut on the end of the bolt, the nut being adapted to be tightened to place pressure on the at least one washer against to compress the biasing device; and
   placing an adhesive on at least one of the tapered side in the surface and the tapered circumferential surface prior to engagement of the disk in the hole in the composite material, and curing the adhesive to bond the disk to the composite material.

14. The method of claim 13, wherein the biasing device is a coil spring that exert a spring pressure ranging from 30 psi to 100 psi at the adhesive bondline.

15. The method of claim 13, which further comprises removing the nut, at least one washer, biasing device and bolt after the adhesive is cured, attaching a threaded bushing into the hole attaching a second bolt in the treaded bushing hole during future use.

16. The method of claim 13, wherein the disk and surface are formed from the same composite material.

17. The method of claim 13, wherein the plug is a composite material selected from the group consisting of carbon fibers and weaves, and fiberglass fibers and weaves.

18. The method of claim 13, wherein the adhesive is selected from the group consisting of polyimide resin, epoxy resins, and bimaleimide resins.

* * * * *